(12) United States Patent
Yoshida

(10) Patent No.: US 9,036,073 B2
(45) Date of Patent: May 19, 2015

(54) IMAGING APPARATUS AND FOR CONTROLLING AN AUTOMATIC FOCUS (AF) AREA AND AN ENLARGEMENT AREA IN A LIVE VIEW

(71) Applicant: CANON KABUSHIKI KAISHA, Tokyo (JP)

(72) Inventor: Koji Yoshida, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/795,740

(22) Filed: Mar. 12, 2013

(65) Prior Publication Data
US 2013/0250157 A1    Sep. 26, 2013

(30) Foreign Application Priority Data
Mar. 23, 2012    (JP) ................................. 2012-067584

(51) Int. Cl.
*H04N 5/232*    (2006.01)
(52) U.S. Cl.
CPC ................................ *H04N 5/23212* (2013.01)
(58) Field of Classification Search
CPC ........... H04N 5/23212; H04N 5/23296; G03B 13/36; G02B 7/32; G02B 7/36
See application file for complete search history.

(56) References Cited

U.S. PATENT DOCUMENTS

| 7,978,236 B2* | 7/2011 | Takahara et al. ......... 348/240.99 |
| 2004/0145670 A1* | 7/2004 | Hong ....................... 348/333.01 |
| 2005/0104994 A1* | 5/2005 | Morimoto ..................... 348/345 |
| 2011/0019066 A1* | 1/2011 | Takano et al. ................. 348/345 |
| 2011/0109771 A1* | 5/2011 | Onomura ................... 348/240.3 |

FOREIGN PATENT DOCUMENTS

JP    2008-211630 A    9/2008

* cited by examiner

*Primary Examiner* — Luong T Nguyen
(74) *Attorney, Agent, or Firm* — Canon USA Inc IP Division

(57) ABSTRACT

An imaging apparatus enables the user to separately set an AF area and an enlargement area and, when the position of the AF area is changed, eliminates time and effort to change the position of the enlargement area. To achieve this, the imaging apparatus includes an AF area setting unit configured to set an AF area used for AF indicating an area out of the live view image of a subject imaged by an imaging unit, and a control unit configured to change a position of an enlargement area indicating an area to be enlarged in conjunction with a position of the AF area set by the AF area setting unit and configured, in response to an instruction to change the position of the enlargement area, to change the position of the enlargement area without changing the position of the AF area set by the AF area setting unit.

12 Claims, 9 Drawing Sheets

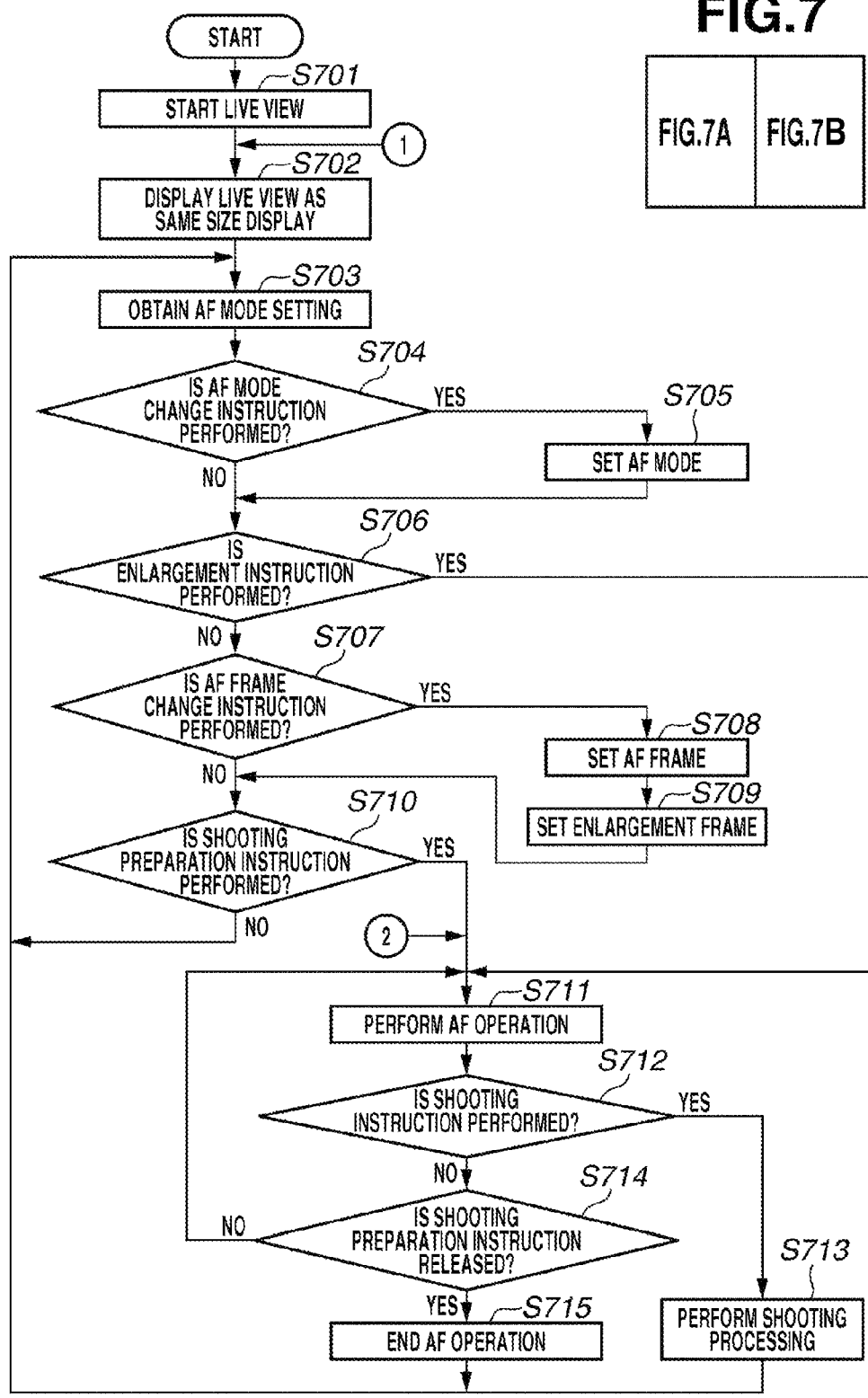

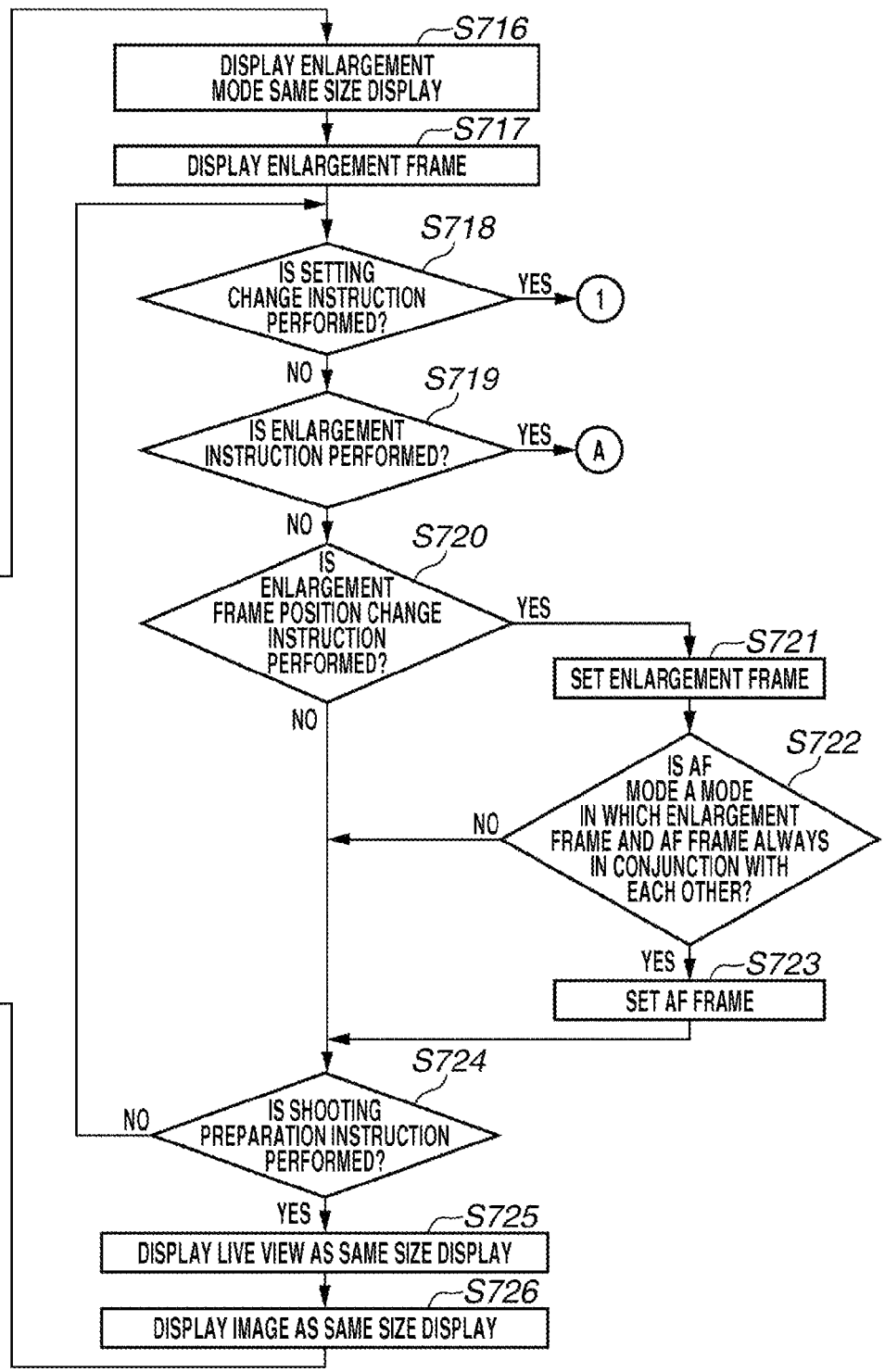

IMAGING APPARATUS AND FOR CONTROLLING AN AUTOMATIC FOCUS (AF) AREA AND AN ENLARGEMENT AREA IN A LIVE VIEW

BACKGROUND OF THE INVENTION

1. Field of the Invention

The present invention relates to an imaging apparatus, a control method for the imaging apparatus, a program, and a storage medium. In particular, the present invention relates to a technology for controlling an automatic focus (AF) area and an enlargement area in a live view in which a through-the-lens image is displayed.

2. Description of the Related Art

Conventionally, there is an imaging apparatus that displays a live view in which the position of an autofocus area and the position of an enlargement are linked with each other. For example, Japanese Patent Application Laid-Open No. 2008-211630 discusses an imaging apparatus in which, when the position of a focus area is changed, the position of an enlargement area is changed according to the changed position of the focus area.

However, the problem with the imaging apparatus discussed in Japanese Patent Application Laid-Open No. 2008-211630 is that an enlargement area cannot be set at a position different from a focus area. For example, when the positions of focus areas are discrete, AF cannot be carried out easily with the imaging apparatus discussed in Japanese Patent Application Laid-Open No. 2008-211630. Specifically, because the position of an enlargement area is determined according to the position of a focus area, the positions of enlargement areas become discrete when the positions of focus areas are discrete. However, it is difficult to discretely perform enlargement display of a plurality of enlargement areas in a small display of the imaging apparatus. If a plurality of enlargement areas are performed enlargement display in the display, the display becomes complicated. On the other hand, setting focus areas and enlargement areas separately at all makes the operation complex to degrade usability.

SUMMARY OF THE INVENTION

Aspects of the present invention is directed to enabling the user to separately set an AF area and an enlargement area and to eliminating time and effort to change the position of the enlargement area when the AF area is changed.

According to an aspect of the present invention, an imaging apparatus includes an imaging unit configured to image a subject image, a display unit configured to display a live view image of the subject image imaged by the imaging unit, an AF area setting unit configured to set an AF area indicating an area used for AF out of the live view image, and a control unit configured to change a position of an enlargement area indicating an area to be enlarged in conjunction with a position of the AF area set by the AF area setting unit, and, configured, in response to an instruction to change the position of the enlargement area, to change the position of the enlargement area without changing the position of the AF area set by the AF area setting unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7, which is composed of FIGS. 7A and 7B, is flowchart illustrating processing of the digital camera in the present exemplary embodiment.

DESCRIPTION OF THE EMBODIMENTS

An exemplary embodiment of the present invention will be described in detail below with reference to the accompanying drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Figure 1A:
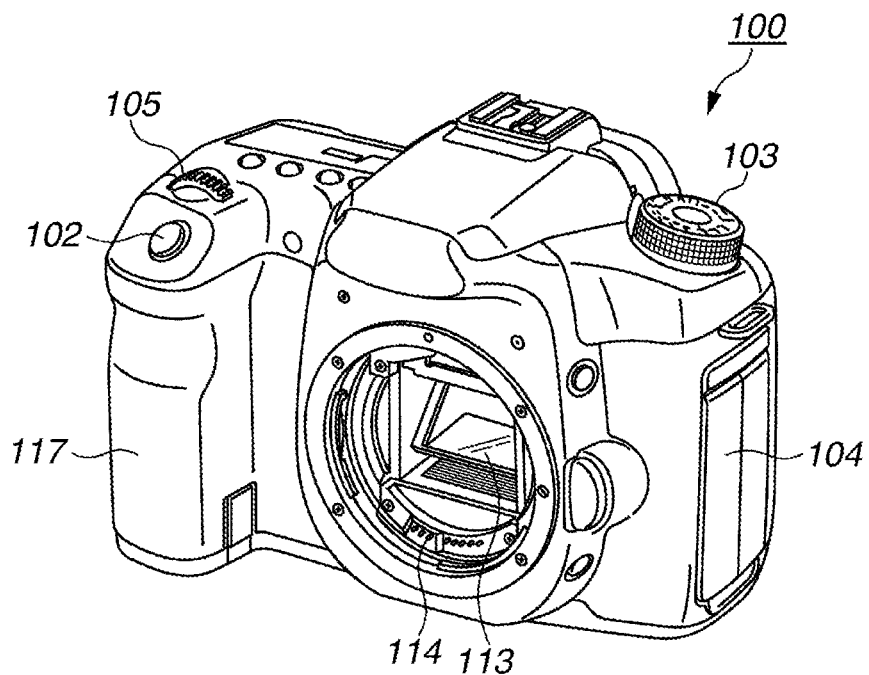
FIGS. 1A and 1B are perspective views illustrating an example of an external view of a digital camera in the present exemplary embodiment.
Figure 1B:
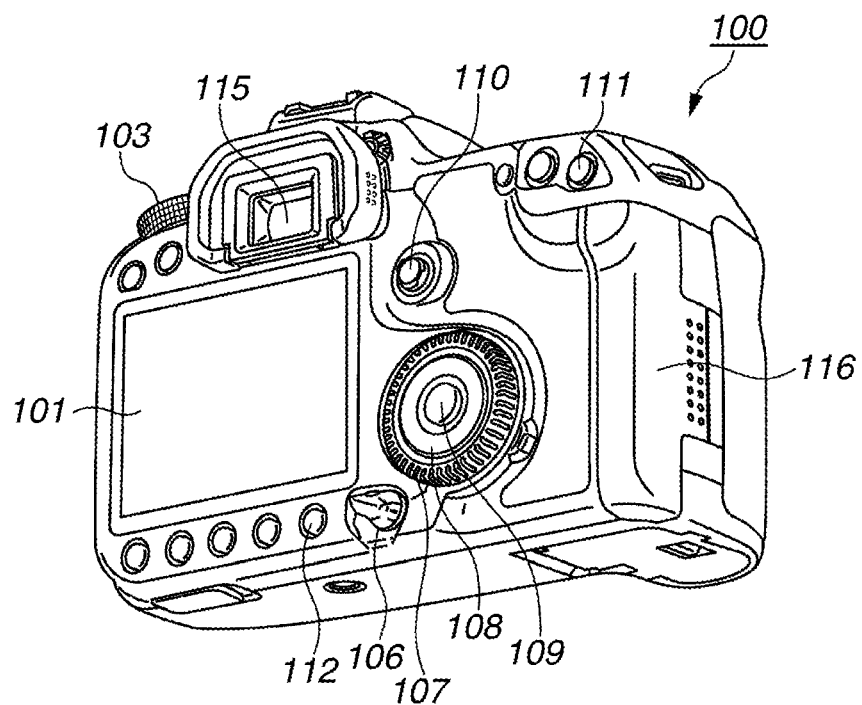

FIG. 1A and FIG. 1B are external views of a digital camera that is an example of an imaging apparatus in the present exemplary embodiment. FIG. 1A is a perspective view of the front of a digital camera 100. FIG. 1B is a perspective view of the back of the digital camera 100.

In FIGS. 1A and 1B, a display unit 101 displays an image and various types of information. A shutter release button 102 is an operation unit for instructing the digital camera to shoot. A mode-changing switch 103 is an operation unit for changing the photographing mode. A terminal cover 104 is a cover that protects connectors (not illustrated) of cables used for connection between the digital camera 100 and an external device. A main electronic dial 105 is a rotary operation member included in an operation unit 28 described below. Rotating the main electronic dial 105 allows the user to change the setting values of the shutter speed and the aperture. A power switch 106 is an operation member for turning on and off the power of the digital camera 100.

A sub-electronic dial 107 is a rotary operation member included in the operation unit 28. By rotating the sub-electronic dial 107, the user can move a selection frame or advances images. A cross key 108, included in the operation unit 28, the user can perform an operation by pressing respective top, bottom, left, and right part corresponding to the part the user presses. A SET button 109 is included in the operation unit 28 and, when pressed, can perform operation mainly such as determination of a selection item.

A live view button 110 is included in the operation unit 28. In the still image shooting mode, the live view button 110 switches between on and off of the live view function that displays a through-the-lens image on the display unit 101. In the moving image shooting mode, the live view button 110 is used to instruct the digital camera to start or stop the moving image shooting (recording).

An enlargement button 111 is an operation unit member included in the operation unit 28. The enlargement button 111 is used to switch between on and off of the enlargement mode during the display of a live view in the shooting mode or to change the enlargement magnification in the enlargement mode. In the playback mode, the enlargement button 111 functions as an operation unit member that increases the enlargement magnification of an image to be played back. A playback button 112, included in the operation unit 28, is an operation unit member that switches between the shooting mode and the playback mode. By pressing the playback button 112 during the shooting mode, the mode transfers to the playback mode to cause the digital camera to display the latest image from among the images, stored in a storage medium 32 described below, on the display unit 101.

A quick return mirror (hereinafter referred to as mirror 113) is moved up and down by an actuator (not illustrated) according to an instruction from a system control unit 10 described below. A communication terminal 114 is a terminal by which the digital camera 100 communicates with a removable lens unit 200 described below. An eyepiece finder 115 is a peephole-type finder used to confirm, through the lens unit 200, the focus and the composition of the optical image of a subject by observing a focusing screen 16 described below. A lid 116 covers the slot in which the storage medium 32 is stored. A grip 117 is a holding unit shaped such that the user can hold the digital camera 100 with the right hand easily.

Figure 2:
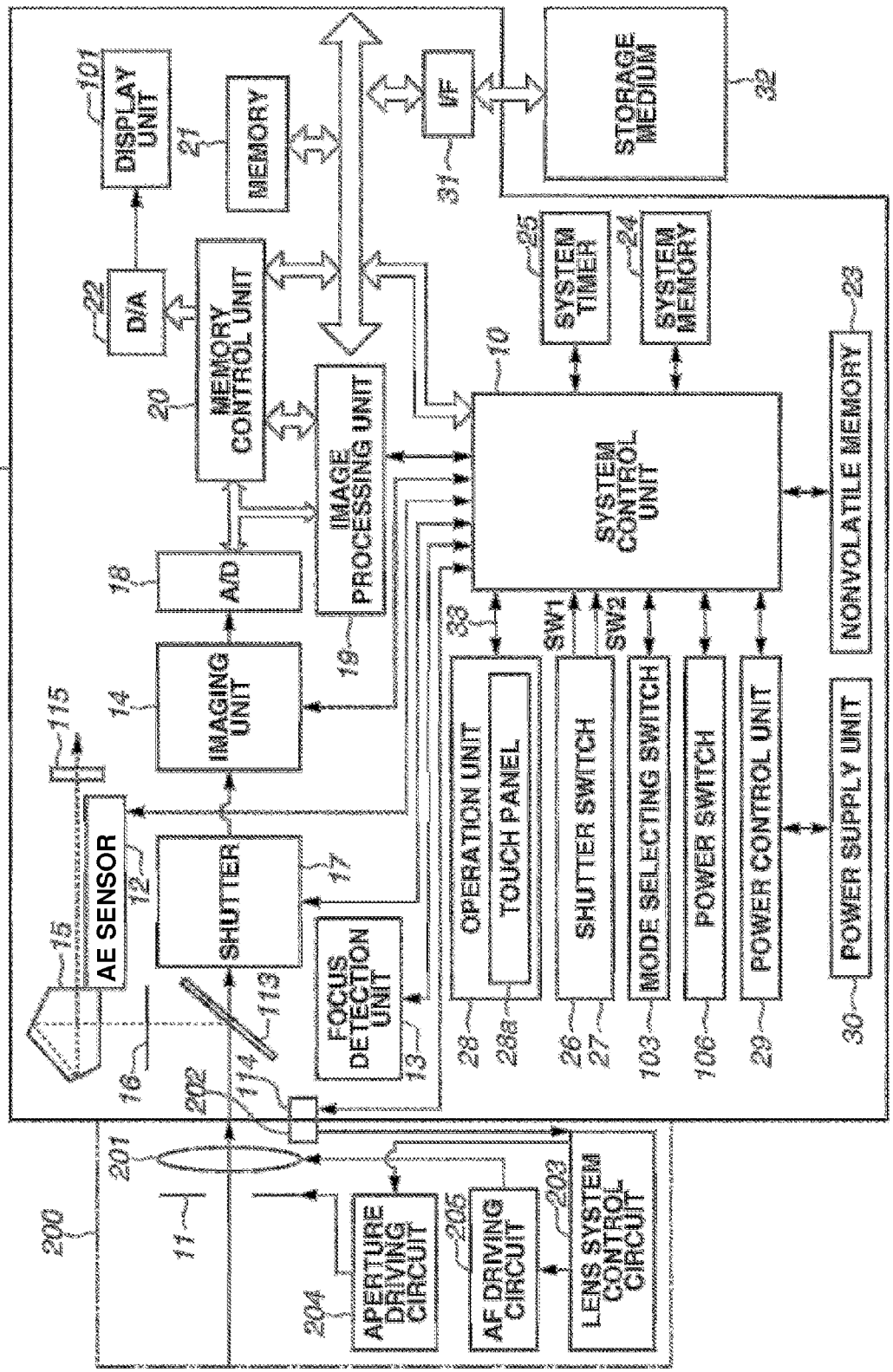
FIG. 2 is a block diagram illustrating an example of a configuration of a digital camera in the present exemplary embodiment.

FIG. 2 is a block diagram illustrating an example of a configuration of the digital camera 100 in the present exemplary embodiment. Referring to FIG. 2, the lens unit 200, which is removable from the digital camera 100, includes a lens 201, a communication terminal 202, a lens system control circuit 203, an aperture driving circuit 204, and an AF driving circuit 205.

Although composed of a plurality of lenses, only one lens is illustrated simply as the lens 201 in this figure. The communication terminal 202 is a terminal by which the lens unit 200 communicates with the digital camera 100. Connection between the communication terminal 202 and the communication terminal 114 of the digital camera 100 enables communication between the lens unit 200 and the digital camera 100. The lens unit 200 communicates with a system control unit 10 via the communication terminals 202 and 114. In response to an instruction from the system control unit 10, the lens system control circuit 203 in the lens unit 200 controls the aperture 11 via the aperture driving circuit 204 and displaces the position of the lens 201 via the AF driving circuit 205 for focusing.

An auto exposure (AE) sensor 12 measures the luminance of a subject received through lens unit 200. A focus detection unit 13 outputs the defocus amount information to the system control unit 10. Based on the defocus amount information, the system control unit 10 controls the lens unit 200 to perform phase-difference AF. The mirror 113 is moved up and down by the actuator (not illustrated) according to an instruction from the system control unit 10 at an exposure time, a live-view shooting time, and a moving-image shooting time. The mirror 113 switches the light flux, incident from the lens 201, between the eyepiece finder 115 side and an imaging unit 14 side. Usually, the mirror 113 is arranged so that the light flux is reflected and directed toward the eyepiece finder 115. At a shooting time or a live view display time, the mirror 113 flips up to guide the light flux toward the imaging unit 14 to retract from the light flux (mirror up). The mirror 113 has its center configured as a half mirror so that a part of light can be transmitted through. This configuration causes a part of the light flux to be transmitted so that it is incident to the focus detection unit 13.

The user can observe a focusing screen 16 via a pentaprism 15 and the eyepiece finder 115 to confirm the focus and the composition of the optical image of a subject obtained through the lens unit 200. A shutter 17 is a focal plane shutter that can freely control the exposure time of the imaging unit 14 according to an instruction from the system control unit 10.

The imaging unit 14 is an imaging device configured with a charge coupled device (CCD) or a complementary metal-oxide semiconductor (CMOS) device that converts a subject image to an electrical signal. An analog to digital (A/D) converter 18 converts an analog signal, output from the imaging unit 14, to a digital signal.

An image processing unit 19 performs resizing processing such as predetermined pixel interpolation processing and reduction, or color conversion processing for data received from the A/D converter 18 or data received from a memory control unit 20. In addition, the image processing unit 19 performs predetermined operation processing using imaged image data. The system control unit 10 performs exposure control and focusing control based on the operation result produced by the image processing unit 19. Based on these control operations, AF processing, AE processing, and electronic flash preliminary emission (EF) processing are performed in the through-the-lens (TTL) mode. In addition, the image processing unit 19 performs predetermined operation processing using imaged image data and, based on the obtained operation result, performs auto white balance (AWB) processing in the TTL mode.

The output data from the A/D converter 18 is written into a memory 21 via the image processing unit 19 and the memory control unit 20 or directly via the memory control unit 20. The memory 21 stores image data, obtained by the imaging unit 14 and converted by the A/D converter 18 into digital data, or image data to be displayed on the display unit 101. The memory 21 has a storage capacity large enough to store a predetermined number of still images and a predetermined time of moving images and voices. The memory 21 also works as a memory (video memory) for displaying images.

A digital to analog (D/A) converter 22 converts display image data, stored in the memory 21, to analog signals and supplies the converted signals to the display unit 101. Therefore, the display image data, written in the memory 21, is displayed on the display unit 101 via the D/A converter 22. The display unit 101 displays data, corresponding to the analog signals received from the D/A converter 22, on a display such as a liquid crystal display (LCD). The digital signals, once converted by the A/D converter 18 to the digital form and accumulated in the memory 21, are converted by the D/A converter 22 to the analog signals. The converted analog signals are then serially transferred to the display unit 101 for display thereon. In this way, the display unit 101 functions as an electronic view finder. In other words, a through-the-lens image (live view display) can be displayed on the display unit 101.

A nonvolatile memory 23 is an electrically erasable and capable of storing memory. For example, an electrically erasable programmable read-only memory (EEPROM) is used for the nonvolatile memory 23. The nonvolatile memory 23 stores therein constants and programs required for the operation of the system control unit 10. The programs stored in the nonvolatile memory 23 are those for executing the flowcharts described below in the present exemplary embodiment.

The system control unit 10 controls the entire of the digital camera 100. The system control unit 10 executes the programs stored in the nonvolatile memory 23 to implement each processing of the present exemplary embodiment described below. The system control unit 10 also controls the memory 21, D/A converter 22, and display unit 101 to perform display control. In a system memory 24, the constants and variables used for the operation of the system control unit 10, as well as the programs read from the nonvolatile memory 23, are expanded. For example, a random access memory (RAM) is used for the system memory 24. A system timer 25 is a time measuring unit that measures the times used for various control operations and the time of a built-in clock.

The mode selecting switch 103, a first shutter switch 26, a second shutter switch 27, and the operation unit 28 are operation units via which the user enters various operation instructions into the system control unit 10.

The mode selecting switch 103 is used to switch the operation mode of the system control unit 10 to one of the still image shooting mode, moving image shooting mode, and playback mode. The still image shooting mode includes the following modes: auto shooting mode, auto scene determination mode, manual mode, various scene modes that are set for shooting by captured scene, programmed AE mode, and custom mode. The user can directly switch the mode to one of the modes included in the still image shooting mode by using the mode selecting switch 103. The user can also once switch the mode to the still image shooting mode by using the mode changing switch 103 and then switch the mode to any one of the modes included in the still image shooting mode by using another operation member. Similarly, the moving image shooting mode may include a plurality of modes.

The first shutter switch 26 is turned on in the middle of the operation of the shutter release button 102, that is, when the shutter release button 102 is pressed halfway (shooting preparation instruction). The first shutter switch 26, when turned on, generates a first shutter switch signal SW1. In response to the first shutter switch signal SW1, the system control unit 10 starts a shooting preparation operation such as the AF processing, AE processing, AWB processing, and EF processing.

The second shutter switch 27 is turned on when the operation of the shutter release button 102 is completed, that is, when the shutter release button 102 is pressed completely (shooting instruction). The second shutter switch 27, when pressed completely, generates a second shutter switch signal SW2. The generation of the second shutter switch signal SW2 causes the system control unit 10 to start a sequence of shooting processing operations, from the operation of reading signals from the imaging unit 14 to the operation of writing image data on the storage medium 32.

The operation unit 28, an input unit that accepts operations from the user, includes various operation members. The operation unit 28 includes at least a main electronic dial 105, sub-electronic dial 107, cross key 108, SET button 109, live view button 110, enlargement button 111, and playback button 112. The user selects and operates one of function icons displayed on the display unit 101, so that a function is appropriately assigned to the operation unit 28 for each of scenes, and the operation unit 28 functions as various function buttons. The function buttons include a menu button, an end button, a return button, an image advancing button, a jump button, an aperture button, and an attribute change button. For example, when the menu button is pressed, the menu screen is displayed on the display unit 101 to allow the user to specify various settings. Using the menu screen displayed on the display unit 101 as well as the cross key 108 and SET button 109, the user can intuitively specify various settings.

A power control unit 29, which includes a battery detection circuit, a DC-DC converter, and a switch circuit that switches the blocks to be powered on, detects whether a battery is mounted, the battery type, and the remaining battery capacity. In addition, the power control unit 29 controls the DC-DC converter to supply a necessary voltage to various parts, including the storage medium 32, for a necessary period based on the detection result and an instruction received from the system control unit 10.

A power supply unit 30 includes a primary battery such as an alkaline battery and a lithium battery, a secondary battery such as a nickel-cadmium (NiCd) battery, a nickel metal hydride (Ni-MH) battery, and a lithium-ion battery, or an alternating current (AC) adapter. A storage medium interface (I/F) 31 is an interface to the storage medium 32. The recording medium 32 is a medium on which captured images are recorded. As the storage medium 32, a semiconductor memory, a memory card, a magnetic disk, or a hard disk is used.

As one component of the operation unit 28, the digital camera 100 includes a touch panel 28a capable of detecting a touch onto the display unit 101. The touch panel 28a and the display unit 101 are integrally configured. For example, the touch panel 28a is mounted on the upper layer of the display surface of the display unit 101 so that light transmittance does not affect a display on the display unit 101. The input coordinates on the touch panel 28a and the display coordinates on the display unit 101 are associated. This association allows a graphical user interface (GUI) to be configured in which the user feels as if the user can directly operate the screen displayed on the display unit 101. Various types of method may be used for the touch panel 28a. Among them are a resistive film method, an electrostatic capacity method, a surface acoustic wave method, an infrared method, an electromagnetic induction method, an image recognition method, and an optical sensor method.

The system control unit 10 can detect the following user's operations on the touch panel 28a: the user touches the touch panel 28a with a finger or a pen (hereinafter referred to as touch-down), the user keeps a finger or a pen on the touch panel 28a (hereinafter referred to as touch-on), the user keeps a finger or a pen on the touch panel 28a and moves it (hereinafter referred to as move), the user lifts a finger or a pen from the touch panel 28a (hereinafter referred to as touch-up), and the user does not touch the touch panel 28a (hereinafter referred to as touch-off).

The operation described above, as well as the position coordinates on the touch panel 28a touched by a finger or a pen, is notified to the system control unit 10 via an internal bus 33. Based on the notified information, the system control unit 10 determines what operation is performed on the touch panel 28a. For the move operation, the system control unit 10 determines the movement direction of a finger or a pen, which moves on the touch panel 28a, for each of the vertical component and the horizontal component on the touch panel 28a based on a change in the position coordinates. When the user performs a touch-down operation on the touch panel 28a, then performs a predetermined amount of the move operation, and then performs the touch-up operation, the operations correspond to drawing a stroke. The operation of quickly drawing a stroke is referred to as "flick". "Flick" refers to an operation of sliding a finger over a predetermined distance with the finger touching onto the touch panel 28a and then directly lifting the finger. In other words, "flick" is an operation of quickly tracing the touch panel 28a with a finger in such a way as to flick the touch panel 28a with a finger. When it is detected that the user performs the move operation over greater or equal to a predetermined distance at greater or equal to a predetermined speed and then directly performs the touch-up operation, the system control unit 10 determines that the flick operation is performed. On the other hand, when it is detected that the user performs the move operation over greater or equal to a predetermined distance at a speed smaller than a predetermined speed, the system control unit 10 determines that the drag operation is performed.

The digital camera 100 in the present exemplary embodiment is capable of setting one of the AF modes described below according to an operation by the user via the operation unit 28. The AF mode refers to a mode of the AF operation.

Live One-Point AF Mode

Figure 3A:
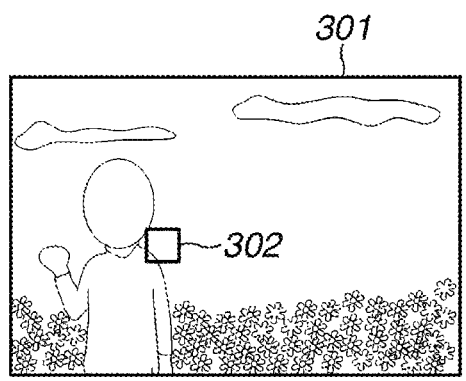
FIGS. 3A, 3B, 3C, and 3D are diagrams illustrating display examples of a through-the-lens image in the present exemplary embodiment.

The live one-point AF mode refers to an AF mode in which, using a through-the-lens image, contrast AF (television auto focusing (TVAF)) is performed using a user-specified part out of the through-the-lens image (within display range). FIG. 3A illustrates an example of a display on the display unit 101 when the live one-point AF mode is set. In the live one-point AF mode, an AF frame 302 is displayed superimposed on a through-the-lens image 301 as illustrated in FIG. 3A. An AF frame (AF area) refers to a frame indicating an area for which focus adjustment is performed within a through-the-lens image. The AF frame 302 can be moved in the up, down, left, and right directions according to operation by the user via the cross key 108 or the touch panel 28a. When the first shutter switch 26 is turned on, contrast AF is performed in the AF frame 302.

Live Multipoint AF Mode

Figure 3B:
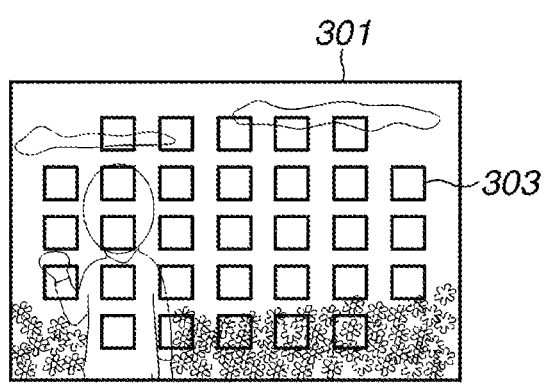

The live multipoint AF mode refers to an AF mode in which, using a through-the-lens image, contrast AF is performed using an AF frame automatically determined by the digital camera 100 from among a plurality of AF frames (31 frames in the present exemplary embodiment). In the live multipoint AF mode, a plurality of AF frames 303 (candidates for an AF frame actually used for AF) is set on the display screen as illustrated in FIG. 3B. When the first shutter switch 26 is turned on, the AF frame to be used is automatically determined and, within that AF frame, contrast AF is performed. After AF ends, only the in-focus AF frame from among the AF frame candidates to be used is displayed with the other AF frames placed in non-display mode while the first shutter switch 26 is on.

In the live multipoint AF mode, a zone selection may be performed. In the zone selection, only a part of AF frames out of all 31 AF frames are set as the candidates for AF frames to be used. For example, in the 31 AF frames illustrated in FIG. 3B, there are the following zones: upper-left zone including 8 candidates in three rows and three columns in the upper-left part, upper-central zone including 9 candidates in three rows and three columns in the upper-central part, and upper-right zone including 8 candidates in three rows and three columns in the upper-right part. Similarly, there are the following zones: central-left zone (9 frames), central-central zone (9 frames), central-right zone (9 frames), lower-left zone (8 frames), lower-central zone (9 frames), and lower-right zone (8 frames). The user can select a zone from a total of 10 zones (all nine zones described above plus one zone including all (31) frames).

Figure 3D:
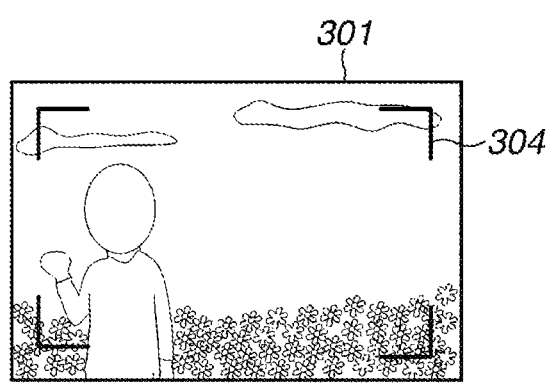

Displaying all AF frames affects the visibility of a through-the-lens image. To address this problem, the user may display a frame 304, which indicates a range including a plurality of AF frames, as illustrated in FIG. 3D. The frame 304 illustrated in FIG. 3D, which is a frame displayed when "entire zone" is selected at zone selection, indicates an area including 31 AF frames. When the user selects respective other zones, a frame indicates an area including the AF frames included in the selected zone.

Face+Tracking AF Mode

The face+tracking AF mode refers to an AF mode to perform AF in which a face image, detected in a through-the-lens image, or a subject corresponding to the position where the user touches the display unit 101 (touch panel 28a) is dynamically tracked as a target to be performed automatic focus.

Quick AF Mode

Figure 3C:
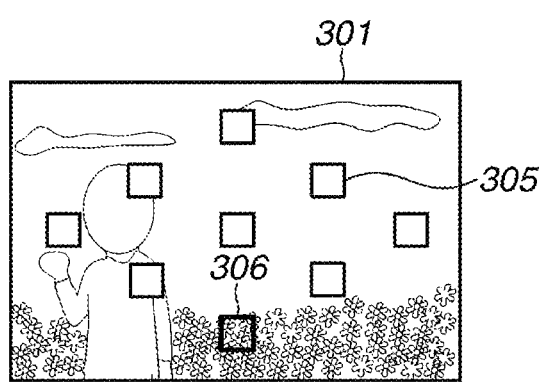

The quick AF mode refers to an AF mode in which phase-difference AF is performed using an AF frame selected by the user, via the operation unit 28, from the AF frames prepared for phase-difference AF (AF frame candidates to be actually used in AF) that are a plurality of predefined AF frames (nine frames in the present exemplary embodiment). FIG. 3C illustrates an example of display on the display unit 101 when the mode is set to the quick AF mode. In the quick AF mode, predefined nine AF frames 305 are displayed superimposed on the through-the-lens image 301 as illustrated in FIG. 3C. One of the AF frames 305 is selected according to an operation performed by the user. For example, an AF frame 306, when selected in FIG. 3C, is displayed in a color identifiable from other AF frames. A selected AF may be changed to another AF frame according to the operation of the main electronic dial 105 or the sub-electronic dial 107. When the first shutter switch 26 is turned on, the mirror 113 flips up to perform phase-difference AF using a selected AF frame.

To change the mode to any one of the AF modes described above, the user selects via the operation unit 28 the AF mode options displayed on the display unit 101 to change the mode. More specifically, while the live view is displayed, the user presses the menu button, included in the operation unit 28, to display the setting menu on the display unit 101. After that, the user selects a menu item for changing the AF mode and selects any one of the AF modes, displayed as options, to change the AF mode.

In the present exemplary embodiment, the display setting is switched in order as follows each time the user presses the enlargement button 111: "live view same size display"→"enlargement mode same size display"→"enlargement mode five-fold display"→"enlargement mode ten-fold display"→"live view same size display".

Figure 4A:
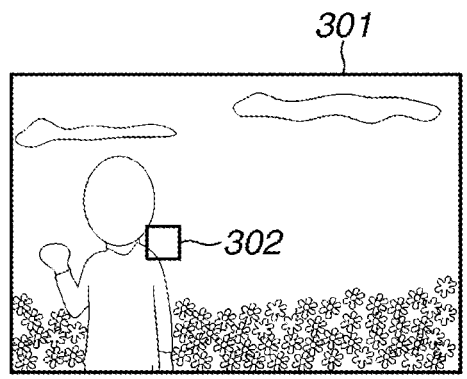
FIGS. 4A, 4B, and 4C are diagrams illustrating display examples of an AF frame and an enlargement frame in a live one-point mode in the present exemplary embodiment.
Figure 4B:
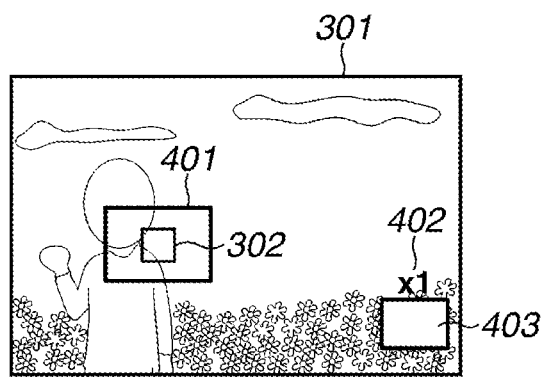
Figure 4C:
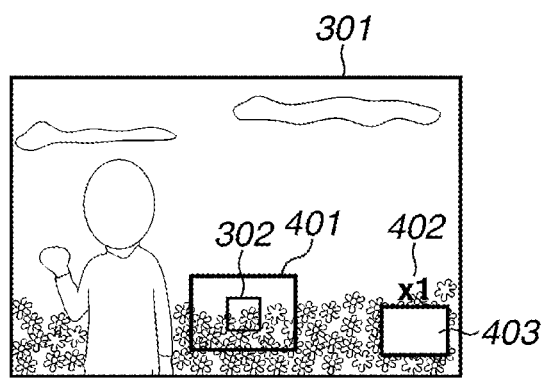

FIGS. 4A to 4C are diagrams illustrating examples of display on the display unit 101 followed by switching the screen according to pressing of the enlargement button 111.

FIG. 4A is a diagram illustrating an example of live view same size display when the AF mode is the live one-point AF mode. This figure is the same figure as that illustrated in FIG. 3A. When the enlargement button 111 is pressed in this state, the display is changed to the enlargement mode same size display (live one-point AF mode) such as that illustrated in FIG. 4B. In the enlargement mode same size display, the following are displayed: the AF frame 302, an enlargement frame 401 whose center coincides with the center of the AF frame 302, an enlargement magnification 402, and an indicator 403 indicating the position of the enlargement frame 401 with respect to the entire shooting range. The enlargement frame (enlargement area) is a frame indicating an area to be displayed in an enlarged form in response to an enlargement instruction. In this example, the enlargement frame indicates a five-fold enlargement. In this state, the user can move the enlargement frame 401 to any position using the cross key 108.

In the live one-point AF mode, the AF frame 302 moves in conjunction with the enlargement frame 401. FIG. 4C illustrates an example of display on the display unit 101 when the enlargement frame 401 is moved. Since the AF frame 302 moves in conjunction with the enlargement frame 401 in the live one-point AF mode, the AF frame 302 moves following the movement of the enlargement frame 401 in such a manner that the center of the AF frame 302 coincides with the center of the enlargement frame 401. Considering that the display of the enlargement frame 401 and the AF frame 302 tends to be complicated, the AF frame 302 may not be displayed in the enlargement mode, since the enlargement frame 401 and the AF frame 302 move in conjunction with each other.

Figure 5A:
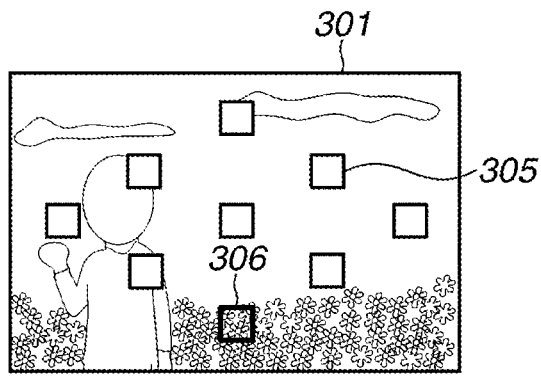
FIGS. 5A, 5B, and 5C are diagrams illustrating display examples of AF frames and enlargement frames in a live multipoint mode in the present exemplary embodiment.

FIG. 5A is a diagram illustrating an example of live view same size display when the AF mode is the quick AF mode. This figure is the same figure as that illustrated in FIG. 3C. When the enlargement button 111 is pressed in this state, the display is changed to the enlargement mode same size display (quick AF mode) such as that illustrated in FIG. 5B. In the enlargement mode same size display, the following are displayed: the AF frame 306, an enlargement frame 501 indicating the five-fold enlarged display range, an enlargement magnification 502, and an indicator 503 indicating the position of the enlargement frame 501 with respect to the entire shooting range. The enlargement frame 501 is displayed with the center coinciding with the center of the selected AF frame 306. In this state, the user can move the enlargement frame 501 to any position by operating the cross key 108.

In the quick AF mode and the live multipoint AF mode, the AF frame does not coordinate with the movement of the enlargement frame. FIG. 5C illustrates an example of display on the display unit 101 when the enlargement frame 501 is moved. Since the AF frame 306 does not coordinate with the movement of the enlargement frame 501 in the quick AF mode, the enlargement frame 501 can be moved to a position different from the position of the AF frame 306.

In addition, assuming that in a case where the AF frame is changed, the enlargement frame 501 is moved to the position of the changed AF frame in conjunction with thereof. The enlargement frame 501 is moved in conjunction with a selected AF frame considering that the user usually wants to enlarge and confirm the new position (position of the AF frame) on which focus is placed. Therefore, when the user moves an AF frame or selects an AF frame, time and effort for the user to move the enlargement frame to the position near to the AF frame can be eliminated, and thus operability increases.

Figure 6:
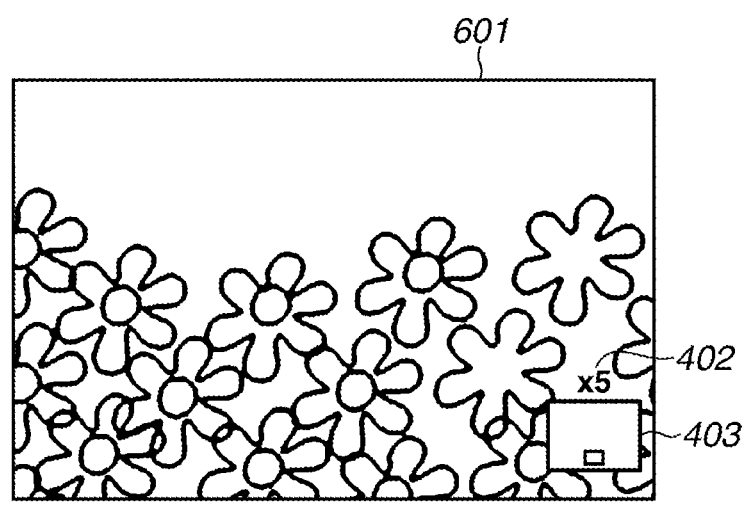
FIG. 6 is diagram illustrating a display example of enlargement display in the present exemplary embodiment.

FIG. 6 is a diagram illustrating an example of display of the enlargement mode five-fold display when the enlargement button 111 is pressed in the enlargement mode same size display state. FIG. 6 illustrates an example of display when the enlargement button 111 is pressed in the state illustrated in FIG. 4C. A through-the-lens image is enlarged and displayed on the entire display screen of the display unit 101, wherein the through-the-lens image is an image imaged in a partial range of the imaging unit 14 and corresponding to the position where the enlargement frame 401 is displayed in the enlargement mode same size display. In the enlargement mode five-fold display, the following are displayed: a display 601 corresponding to the enlargement frame 401 in FIG. 4C, the enlargement magnification 402, and the indicator 403 indicating the position of the display 601 with respect to the entire shooting range.

Note that, if the enlargement frame 501 is moved to a position different from the position of the selected AF frame 306 as shown in FIG. 5C and, after that, the display is changed to the enlargement mode five-fold display, the through-the-lens image corresponding to the enlargement frame 501 is displayed.

Figure 8:
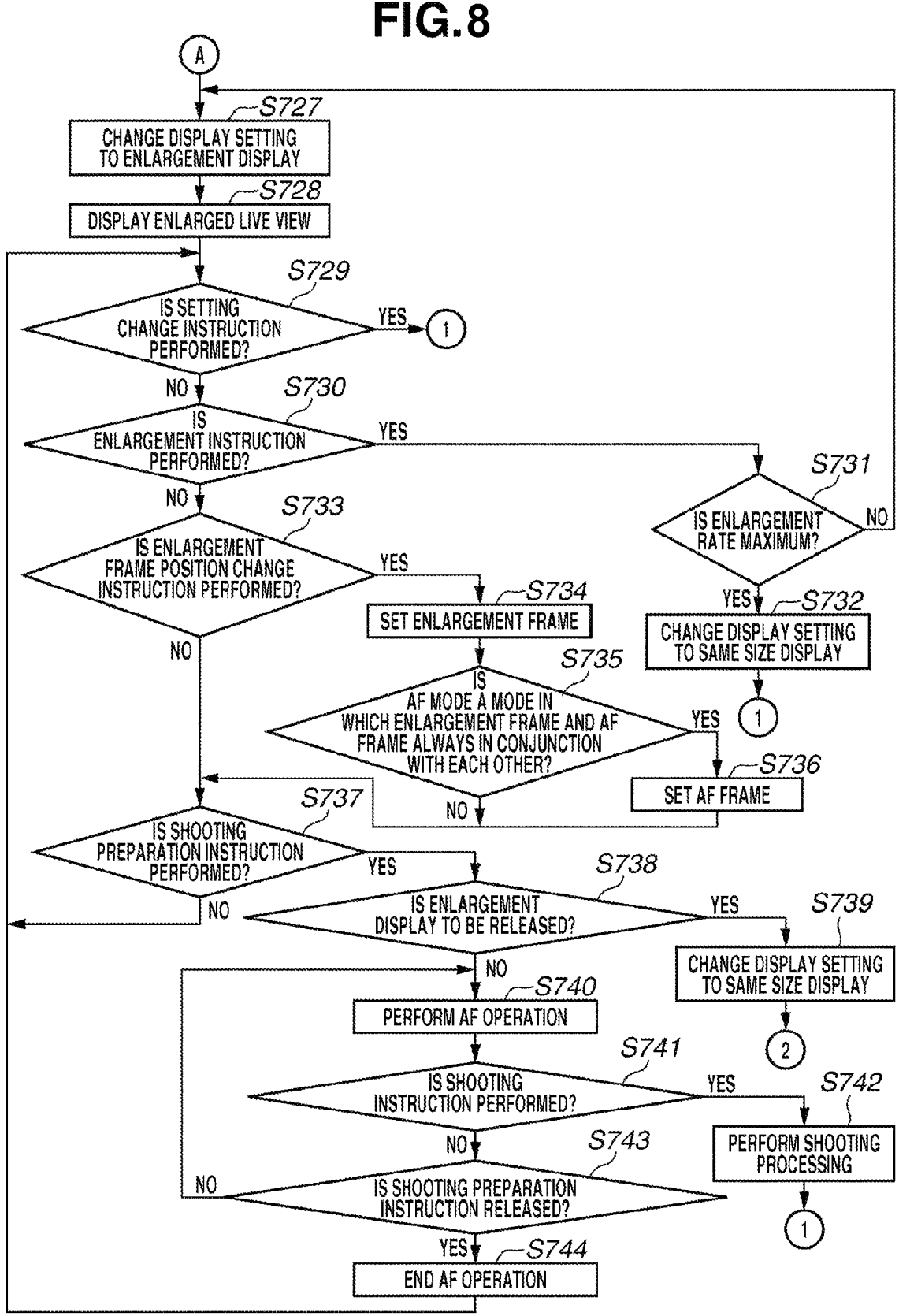
FIG. 8 is flowchart illustrating processing of the digital camera in the present exemplary embodiment.

Next, the processing procedure for implementing an example of display of the digital camera 100 described above is described with reference to the flowcharts illustrated in FIG. 7 and FIG. 8. FIG. 7, which is composed of FIGS. 7A and 7B, and FIG. 8 are flowcharts illustrating the processing that the digital camera 100 in the present exemplary embodiment executes in the shooting mode. The system control unit 10 expands the program stored in the nonvolatile memory 23 into the system memory 24 for carrying out this processing.

In step S701, the system control unit 10 receives a live view start operation instruction from the operation unit 28 and starts the live view in which a through-the-lens image is displayed on the display unit 101. In this case, the system control unit 10 sets the display setting to "live view same size display" and stores the display setting in the nonvolatile memory 23.

In step S702, the system control unit 10 displays the live view as a same size display on the display unit 101. "Same size" refers to an enlargement magnification at which the entire part of a through-the-lens image, imaged using the entire range of the imaging unit 14, is displayed on the display unit 101.

In step S703, the system control unit 10 obtains the AF mode setting information stored in the nonvolatile memory 23. The system control unit 10 displays one or more AF frames according to the AF mode that is set. For example, in the live view same size display when the AF mode is the live one-point mode, the system control unit 10 displays an AF frame as illustrated in FIG. 3A. In the live view same size display when the AF mode is the quick AF mode, the system control unit 10 displays AF frames as illustrated in FIG. 3C.

In step S704, the system control unit 10 determines whether an AF mode change instruction is performed by the operation unit 28. If an AF mode change instruction is performed (YES in step S704), the operation proceeds to step S705. If an AF mode change instruction is not performed (NO in step S704), the operation proceeds to step S706.

In step S705, the system control unit 10 stores the new AF mode setting information, specified by the change instruction performed by the operation unit 28, in the nonvolatile memory 23. After that, the system control unit 10 updates the display on the display unit 101 according to the AF mode that is set. This processing corresponds to an example of the processing of an AF mode setting unit. At this time, when the AF mode is changed to the live multipoint AF mode, the system control unit 10 changes the enlargement frame position information in such a manner that the center of the position of the enlargement frame stored in the system memory 24 coincides with the center of the live view same size display. After that, the system control unit 10 sets the changed position information about the enlargement frame in the system memory 24. Note that the enlargement frame is not displayed at this time in the present exemplary embodiment.

In step S706, the system control unit 10 determines whether an enlargement instruction is performed by the operation unit 28. This processing corresponds to an example of the processing of the enlargement instruction detection unit. If an enlargement instruction is performed (YES in step S706), the operation proceeds to step S716. If an enlargement instruction is not performed (NO in step S706), the operation proceeds to step S707.

In step S707, the system control unit 10 determines whether an AF frame change instruction is performed by the operation unit 28. In the live one-point AF mode, the AF frame change is a movement of the position of the AF frame according to the operation on the cross key 108. In the quick AF mode, the AF frame change is a change of the AF frame to be selected from among the nine AF frames. In the live multipoint AF mode and the face+tracking AF mode, the system control unit 10 does not accept an AF frame change instruction because the AF frame is automatically determined. Therefore, in the live multipoint AF mode and the face+tracking AF mode, the system control unit 10 proceed to NO in step S707 without performing processing in step S707 and the operation proceeds to step S710. Note that, when a zone is selected in the live multipoint AF mode, the operation may proceed to step S708. If an AF frame change instruction is performed in step S707 (YES in step S707), the operation proceeds to step S708. If an AF frame change instruction is not performed (NO in step S707), the operation proceeds to step S710.

In step S708, the system control unit 10 stores the new AF frame position information, which is specified by the change instruction performed by the operation unit 28, in the system memory 24 to set the AF frame. After that, the system control unit 10 changes the position of the AF frame or the position of the selected AF frame and displays the AF frame on the display unit 101. This processing corresponds to an example of a processing by an AF area setting unit.

In step S709, the system control unit 10 changes the position of the enlargement frame according to the position of the AF frame that has been changed in step S708. Then, the system control unit 10 stores the information about the changed position of the enlargement frame in the system memory 24 to set the enlargement frame. Specifically, the system control unit 10 changes the position of the enlargement frame in such a manner that the center of the enlargement frame coincides with the center of the changed position of the AF frame (AF frame 302 in the live one-point AF mode or AF frame 306 in the quick AF mode). When the position of the AF frame is changed in the AF mode (live one-point AF mode, quick AF mode) in which one AF frame is selected, the system control unit 10 changes the position of the enlargement frame in such a manner that the center of the enlargement frame coincides with the center of the changed position of the AF frame. In the AF mode in which a plurality of AF frames is selected (zone selection is specified in the live multipoint AF mode), the system control unit 10 changes the position of the enlargement frame in such a manner that the center of the enlargement frame coincides with the center of the zone (area) that is defined as an area including the selected plurality of AF frames. In the present exemplary embodiment, the enlargement frame is not displayed at this time.

In step S710, the system control unit 10 determines whether the user presses the shutter release button 102 halfway to turn on the first shutter switch 26 and, as a result, the first shutter switch signal SW1 is generated. That is, the system control unit 10 determines whether a shooting preparation instruction is performed. This processing corresponds to an example of the processing of the shooting preparation instruction detection unit. If the first shutter switch signal SW1 is generated (YES in step S710), the operation proceeds to step S711. If the first shutter switch signal SW1 is not generated (NO in step S710), the operation returns to step S703.

In step S711, the system control unit 10 performs the AF operation according to the setting of the AF mode. In the live multipoint AF mode, the system control unit 10 determines an AF frame to be used for focus adjustment from among the plurality of AF frames, stores the AF frame position information in the system memory 24, and then performs the AF operation. In step S712, the system control unit 10 determines whether the user presses the shutter release button 102 completely to turn on the second shutter switch 27 and, as a result, the second shutter switch signal SW2 is generated. That is, the system control unit 10 determines whether a shooting instruction is performed. If the second shutter switch signal SW2 is generated (YES in step S712), the operation proceeds to step S713. If the second shutter switch signal SW2 is not generated (NO in step S712), the operation proceeds to step S714.

In step S713, the system control unit 10 starts a sequence of shooting processing, from the reading of the signal from the imaging unit 14 to the writing of image data in the storage medium 32. The shooting processing in this step is referred to as "actual shooting" to distinguish this shooting from the shooting of a through-the-lens image. After the actual shooting is performed, the operation returns to step S703.

On the other hand, in step S714, the system control unit 10 determines whether the user ends the half-pressing of the shutter release button 102 to turn off the first shutter switch 26 and, as a result, the generation of the first shutter switch signal SW1 is stopped. That is, the system control unit 10 determines whether the shooting preparation instruction is released. If the shooting preparation instruction is released (YES in step S714), the operation proceeds to step S715. If the shooting preparation instruction is not released (NO in step S714), the operation returns to step S711. In step S715, the system control unit 10 terminates the AF operation.

On the other hand, in step S716, the system control unit 10 changes the display setting to the enlargement mode same size display according to the enlargement instruction received in step S706. After that, the system control unit 10 stores the display setting in the nonvolatile memory 23. The enlargement mode same size display refers to a display setting in which the enlargement frame is displayed superimposed on the display in the live view same size display state. In the enlargement mode same size display, the position of the enlargement frame can be changed.

Figure 5B:
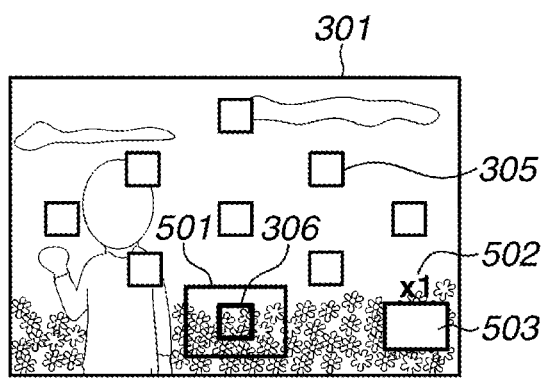
Figure 5C:
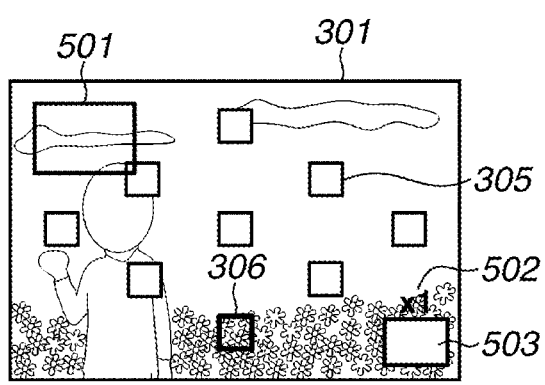

In step S717, the system control unit 10 displays the enlargement frame in the same size display, such as that illustrated in FIG. 4B or FIG. 5B, on the display unit 101 according to the display setting that is set in step S716. In this case, if the position of the enlargement frame is changed according to the position of the AF frame in step S709, the system control unit 10 displays the enlargement frame in conformity with the AF frame. Therefore, when the user wants to confirm the area around the AF frame, the user need not move the enlargement frame to an area around the AF frame. Instead, the user can enter an enlargement instruction in step S719 described below to confirm the through-the-lens image around the AF frame. In the live multipoint AF mode, if the AF operation is not performed up to this time, in addition, if a zone is not selected, the enlargement frame is set in the center of the live view same size display in step S705 and, therefore, the enlargement frame is displayed in the center of the display screen.

In step S718, the system control unit 10 determines whether a setting change instruction is performed by the operation unit 28. If a setting change instruction is performed (YES in step S718), the system control unit 10 displays a dialog for changing the setting to accept an operation to change various settings. The setting changes that can be accepted at this time include at least an AF mode change. If a setting change instruction is performed (YES in step S718), the operation of the system control unit 10 returns to step S702 to return the display setting to the live view same size display. On the other hand, if a setting change instruction is not performed (NO in step S718), the operation proceeds to step S719.

In step S719, the system control unit 10 determines whether an enlargement instruction is performed by the operation unit 28. This processing corresponds to an example of the processing of the enlargement instruction detection unit. If an enlargement instruction is performed (YES in step S719), the operation proceeds to step S727. If an enlargement instruction is not performed (NO in step S719), the operation proceeds to step S720. In step S720, the system control unit 10 determines whether an enlargement-frame position change instruction is performed by the operation unit 28. If an enlargement frame position change instruction is performed (YES in step S720), the operation proceeds to step S721. If an enlargement frame position change instruction is not performed (NO in step S720), the operation proceeds to step S724.

In step S721, the system control unit 10 stores the enlargement frame position information, changed by the operation unit 28, in the system memory 24 to set the enlargement frame and changes the position of the enlargement frame in the live view.

In step S722, the system control unit 10 obtains the AF mode setting information stored in the nonvolatile memory 23 and determines whether an AF mode in which the enlargement frame and the AF frame are always in conjunction with each other (live one-point AF mode in the present exemplary embodiment) is set. In a case where the AF mode in which the enlargement frame and the AF frame always in conjunction with each other is set (YES in step S722), the operation proceeds to step S723. In a case where an AF mode not in the AF mode in which the enlargement frame and the AF frame are always in conjunction with each other is set (NO in step S722), the operation proceeds to step S724.

In step S723, to cause the AF frame to be in conjunction with the changed position of the enlargement frame, the system control unit 10 changes the AF frame position information in such a manner that the AF frame position information matches the enlargement frame position information stored in step S721 and then stores the changed position information in the system memory 24. On the other hand, in a case where an AF mode not in the AF mode in which the enlargement frame and the AF frame are always in conjunction with each other (live multipoint AF mode and quick AF mode in the present exemplary embodiment) (NO in step S722) is set, the operation proceeds to step S724. Therefore, the system control unit 10 does not perform processing for causing the AF frame to be in conjunction with the changed position of the enlargement frame. This means that the user can set the AF frame and the enlargement frame separately. This processing allows the user to confirm a through-the-lens image in which the enlargement frame is set in a position different from that of the AF frame in step 728 described below next time an enlargement instruction is performed.

In step S724, the system control unit 10 determines whether the user presses the shutter release button 102 halfway to turn on the first shutter switch 26 and, as a result, the first shutter switch signal SW1 is generated. In other words, the system control unit 10 determines whether a shooting preparation instruction is performed. If the first shutter switch signal SW1 is generated (YES in step S724), the operation proceeds to step S725. If the first shutter switch signal SW1 is not generated (NO in step S724), the operation returns to step S718.

In step S725, the system control unit 10 releases the same size display in which the enlargement frame is displayed and changes the display to the same size display in which the AF frame is displayed without displaying the enlargement frame. More specifically, the system control unit 10 changes the display setting from the enlargement mode same size display to the live view same size display and stores the display setting in the nonvolatile memory 23.

In step S726, the system control unit 10 displays the image as a same size display in which the AF frame is displayed according to the display setting that is set in step S725.

On the other hand, in step S727, the system control unit 10 increases the live view enlargement magnification according to the enlargement instruction in step S719 and changes the display setting to an enlargement display at the enlargement magnification. After that, the system control unit 10 stores the display setting in the nonvolatile memory 23. In the present exemplary embodiment, the system control unit 10 changes the display setting to an enlargement mode five-fold display when the operation first proceeds to step S727.

In step S728, the system control unit 10 displays an enlarged display of the live view on the display unit 101 as illustrated in FIG. 6 according to the display setting that is set in step S727.

In step S729, the system control unit 10 determines whether a setting change instruction is performed by the operation unit 28. If a setting change instruction is performed (YES in step S729), the system control unit 10 displays the setting change dialog to accept an operation to change the setting. The setting changes that can be accepted at this time include at least an AF mode change. If a setting change instruction is received (YES in step S729), the operation of the system control unit 10 returns to step S702 to return the display setting to the live view same size display. On the other hand, if a setting change instruction is not received (NO in step S729), the operation proceeds to step S730.

In step S730, the system control unit 10 determines whether an enlargement instruction is performed by the operation unit 28. If an enlargement instruction is performed (YES in step S730), the operation proceeds to step S731. If an enlargement instruction is not performed (NO in step S730), the operation proceeds to step S733.

In step S731, the system control unit 10 determines whether the live view enlargement rate stored in the nonvolatile memory 23 is the maximum value of the digital camera 100 (ten-fold in the present exemplary embodiment). If the enlargement rate is the maximum value (YES in step S731), the operation proceeds to step S732. If the enlargement rate is not the maximum value (NO in step S731), the operation returns to step S727. In step S732, the system control unit 10 changes the display setting to the same size display, in which the AF frame is displayed, and stores the display setting in the nonvolatile memory 23. After that, the operation returns to step S702.

On the other hand, the system control unit 10 determines in step S733 whether an enlargement-frame position change instruction is performed by the operation unit 28. If an enlargement-frame position change instruction is performed, the operation proceeds to step S734. If an enlargement-frame position change instruction is not performed, the operation proceeds to step S737.

In step S734, the system control unit 10 stores the enlargement-frame position information, instructed to change by the operation unit 28, in the system memory 24 to set the enlargement frame and changes the position of the enlargement frame on the display unit 101 in the live view enlargement display mode (enlargement mode five-fold display in this example). In step S735, the system control unit 10 obtains AF mode setting information, stored in the nonvolatile memory 23, and determines whether the AF mode in which the enlargement frame and the AF frame are always in conjunction with each other (live one-point AF mode in the present exemplary embodiment) is set. In a case where the AF mode in which the enlargement frame and the AF frame are always in conjunction with each other is set (YES in step S735), the operation proceeds to step S736. In a case where an AF mode not in the AF mode in which the enlargement frame and the AF frame always in conjunction with each other is set (NO in step S735), the operation proceeds to step S737.

In step S736, to cause the AF frame to be in conjunction with the changed enlargement frame position, the system control unit 10 changes the AF frame position information so that the AF frame position information matches the enlargement frame position information stored in step S734, and stores the changed AF frame position information in the system memory 24. On the other hand, in a case where an AF mode not in the AF mode in which the enlargement frame and the AF frame always in conjunction with each other (live multipoint AF mode and quick AF mode in the present exemplary embodiment) is set (NO in step S735), the operation proceeds to step S737. Therefore, the system control unit 10 does not perform processing for causing the AF frame to be in conjunction with the changed enlargement-frame position. If an enlargement instruction is performed next time, in step S728, the processing described above allows the user to confirm the through-the-lens image in the enlargement frame, which is set at a position different from the position of the AF frame.

In step S737, the system control unit 10 determines whether the user presses the shutter release button 102 halfway to turn on the first shutter switch 26 and, as a result, the first shutter switch signal SW1 is generated. That is, the system control unit 10 determines whether a shooting preparation instruction is performed. If the first shutter switch signal SW1 is generated (YES in step S737), the operation proceeds to step S738. If the first shutter switch signal SW1 is not generated (NO in step S737), the operation returns to step S729.

In step S738, the system control unit 10 determines whether to release the enlargement display and change the display setting to the same size display when a shooting preparation instruction is performed at the time of an enlargement display. If the enlargement display is changed to the same size display (YES in step S738), the operation proceeds to step S739. If the enlargement display is kept (NO in step S738), the operation proceeds to step S740.

When a shooting preparation instruction is performed at the time of an enlargement display, the system control unit 10 determines whether to change the display setting from the enlargement display to the same size display based on whether an AF mode in which the selected AF frame is always included in the enlargement display is set. In the present exemplary embodiment, the AF mode in which the AF frame is always included in the enlargement display is the live one-point AF mode. Specifically, in the AF operation in the live one-point AF mode, since the system control unit 10 analyzes the live view display screen and always cause the AF frame to be in conjunction with the enlargement frame to set the AF frame in the enlargement display, the AF operation can be performed with the display setting set to the enlargement display. Therefore, in a case where the AF mode in which the AF frame is always included in the enlargement display is set, the system control unit 10 can continue the enlargement display when a shooting preparation instruction is performed at the time of an enlargement display.

On the other hand, in a case where an AF mode in which the selected AF frame is not always included in the enlargement display (live multipoint AF mode and quick AF mode in the present exemplary embodiment) is set, the AF frame may not be included in the enlargement display range. In this case, if the AF operation is performed with the display setting set to the enlargement display, the user sometimes cannot confirm whether focusing is performed properly as a result of the AF operation. In addition, the user sometime cannot visually recognize the state of the major subject near the AF frame and therefore cannot confirm the excellent shutter opportunity. Therefore, when a shooting preparation instruction is performed in an AF mode in which the AF frame is not always included in the enlargement display, the system control unit 10 changes the display setting from the enlargement display to the same size display. When the display setting is changed to the same size display, the user can visually recognize the main subject for which the shooting preparation operation, including AF, is performed. Therefore, the user can confirm whether focusing is performed properly as a result of the AF operation. In addition, the user can visually recognize the state of the main subject around the AF frame, enabling the user to search the preferable shutter opportunity.

Note that the criterion for determining whether to change the display setting from the enlargement display to the same size display when a shooting preparation instruction is performed at the time of an enlargement display is not limited to the determination whether the AF mode in which the selected AF frame is always included in the enlargement display is set. For example, whether to change the display setting from the enlargement display to the same size display may be determined based on whether all selected AF frames are included in the enlargement display at the time when a shooting preparation instruction is performed. For example, consider the case in which the AF frame selected in the quick AF mode is included in the enlargement display range and the case in which a zone selected in the live multipoint AF mode is included in the enlargement display range. In any of those cases, even if the AF operation is performed with the display setting set to the enlargement display, the user can confirm whether focusing is performed properly as a result of the AF operation. Therefore, if all selected AF frames are included in the enlargement display area when a shooting preparation instruction is performed, the system control unit 10 continues the enlargement display even when a shooting preparation instruction is performed at an enlargement display time. Conversely, if any one of the selected AF frames is not included in the enlargement display area at the time when a shooting preparation instruction is performed, the system control unit 10 changes the display setting from the enlargement display to the same size display when a shooting preparation instruction is performed at the time of an enlargement display.

In step S739, the system control unit 10 changes the display setting to the same size display, in which the AF frame is displayed, and stores the display setting in the nonvolatile memory 23. After that, the operation returns to step S711. In this case, the system control unit 10 may store the position information about the enlargement frame, displayed before returning to the same size display, in the memory 21. In the same size display, the enlargement frame before returning to the same size display may be displayed as enlargement frame 501 shown in FIG. 5C.

In step S740, the system control unit 10 performs the AF operation according to the setting of the AF mode and then the operation proceeds to step S741. In step S741, the system control unit 10 determines whether the user presses the shutter release button 102 completely to turn on the second shutter switch 27 and, as a result, the second shutter switch signal SW2 is generated. That is, the system control unit 10 determines whether a shooting instruction is performed. If the second shutter switch signal SW2 is generated (YES in step S741), the operation proceeds to step S742. If the second shutter switch signal SW2 is not generated (NO in step S741), the operation proceeds to step S743. In step S742, the system control unit 10 performs actual shooting and, after the actual shooting ends, the operation returns to step S702. That is, when actual shooting is performed with the display setting set to the enlargement display, the enlargement display is ended.

In step S743, the system control unit 10 determines whether the user ends the half-pressing of the shutter release button 102 to turn off the first shutter switch 26 and, as a result, the generation of the first shutter switch signal SW1 is stopped. That is, the system control unit 10 determines whether the shooting preparation instruction is released. If the shooting preparation instruction is released (YES in step S743), the operation proceeds to step S744. If the shooting preparation instruction is not released (NO in step S743), the operation returns to step S740. In step S744, the system control unit 10 terminates the AF operation.

As described above, the present exemplary embodiment allows the user to separately set an AF area and an enlargement area. In addition, when the AF area is changed, the present exemplary embodiment eliminates time and effort of an operation to change the position of the enlargement area. More specifically, when the AF mode in which an enlargement frame and an AF frame are always in conjunction with each other is set, a process for causing the AF frame to be in conjunction with the enlargement frame that is moved is not performed, and therefore, the user can separately set the AF frame and the enlargement frame. Thus, the user can confirm a through-the-lens image of the enlargement frame set at a position different from that of the AF frame.

When the user moves or selects an AF frame in the present exemplary embodiment, the enlargement frame is set at the same position as that of the AF frame. Therefore, when the user wants to confirm an area around the AF frame, the user can confirm a through-the-lens image near the AF frame without performing operation to move the enlargement frame around the AF frame.

According to the present exemplary embodiment, whether the AF operation is performed with the enlargement display or with the display setting changed from the enlargement display to the same size display is automatically determined according to an AF mode or an AF frame.

More specifically, in an AF mode or an AF frame in which the AF operation can be performed with the enlargement display, the AF operation is performed with the enlargement display. Conversely, in an AF mode or an AF frame in which the AF operation cannot be performed with the enlargement display, the system control unit 10 performs the AF operation after the display setting is changed from the enlargement display to the same size display. Therefore, the user can visually always recognize the main subject, for which the shooting preparation operation, including AF, is performed. This enables the user to confirm whether the imaged subject is in focus as a result of the AF operation.

The system control unit 10 described above may be controlled by one piece of hardware, or the entire imaging apparatus may be controlled by a plurality of pieces of hardware each of which is responsible for a part of processing. While the present invention has been described based on the exemplary embodiment, it is to be understood that the present invention is not limited to a particular exemplary embodiment and that various modes in the scope that does not depart from the spirit of the present invention are also included.

For example, though the user selects one of the nine AF frames in the quick AF mode in the exemplary embodiment described above, the present invention is not limited to this selection method. The system control unit 10 may select one of the nine AF frames. That is, the quick AF mode may be configured so that the user can set a fully automatic mode. When the user sets a fully automatic mode in the quick AF mode, the system control unit 10 can perform the processing similar to that in the live multipoint AF mode.

When a shooting preparation instruction is performed at the time of an enlargement display in the exemplary embodiment, the system control unit 10 determines whether to change the display setting from the enlargement display to the same size display based on whether an AF mode is set to the AF mode in which the AF frame is always in the enlargement display and whether all selected AF frames are in the enlargement display. However, the present invention is not limited to this determination method. For example, the system control unit 10 may determine whether to change the display setting from the enlargement display to the same size display according to whether the total of AF frame areas is larger than a threshold. More specifically, in the live one-point AF mode in which an AF frame is set to one as illustrated in FIG. 3A, the total of the AF frame area is smaller than the threshold. In this case, the system control unit 10 continues the enlargement display even when a shooting preparation instruction is performed. On the other hand, in the quick AF mode in which an AF frame is selected from among a plurality of AF frames as shown in FIG. 3C, the total of the AF frame areas is larger than the threshold because there is a plurality of AF frames. In this case, when a shooting preparation instruction is performed, the system control unit 10 changes the display setting from the enlargement display to the same size display.

Although the example in which the present invention is applied to the digital camera 100 is described in the exemplary embodiment described above, the present invention is applicable not only to the digital camera 100 but also to any apparatus that have an imaging unit. That is, the present invention is applicable to an apparatus that has an imaging unit such as a personal digital assistant (PDA), a mobile phone terminal, a portable image viewer, a digital photo frame, a music player, a game machine, and an electronic book reader.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-067584 filed Mar. 23, 2012, which is hereby incorporated by reference herein in its entirety.

What is claimed is:

1. An imaging apparatus comprising:
an imaging unit configured to image a subject image, wherein the imaging unit has an entire shooting range which represents an area of the subject image that can be imaged by the imaging unit;
a display unit configured to display a live view image of the subject image, imaged by the imaging unit;
an automatic focus (AF) area setting unit configured to set an AF area indicating an area to be used for AF, out of the live view image; and
a control unit configured to change a position of an enlargement area relative to the entire shooting range in conjunction with a position of the AF area set by the AF area setting unit, and configured, in response to an instruction to change the position of the enlargement area relative to the entire shooting range, to change the position of the enlargement area relative to the entire shooting range without changing the position of the set AF area relative to the entire shooting range, wherein the enlargement area indicates an area to be enlarged, wherein the position of the enlargement area is changed relative to the AF area.

2. The imaging apparatus according to claim 1,
wherein the AF area setting unit, in response to an operation by a user for selecting the AF area to be used for AF from among a plurality of AF areas or in response to an automatic AF area selection, sets the AF area, and
wherein the control unit changes the position of the enlargement area according to the position of the selected AF area.

3. The imaging apparatus according to claim 1, further comprising an AF mode setting unit configured to set an AF mode that is a method of an AF operation,
wherein, in a case where an AF mode set by the AF mode setting unit is a first AF mode in which one AF area is set for use in AF,
the control unit, in response to an instruction to change the one AF area set by the AF area setting unit to any position, changes the position of the AF area and, at the same time, changes the position of the enlargement area in conjunction with the position of the AF area, and
the control unit, in response to an instruction to change the position of the enlargement area, changes the position of the enlargement area and, at the same time, changes the position of the AF area in conjunction with the position of the enlargement area; and
wherein, in a case where the AF mode set by the AF mode setting unit is a second AF mode, wherein the second AF mode is a different AF mode than the first AF mode,
the control unit, in response to an instruction to change the position of the enlargement area, changes the position of the enlargement area without changing the position of the AF area set by the AF area setting unit.

4. The imaging apparatus according to claim 1, further comprising an AF mode setting unit configured to set an AF mode that is a method of an AF operation,
wherein in a case where an AF mode set by the AF mode setting unit is a first AF mode in which the position of the AF area set by the AF area setting unit and the position of the enlargement area are always in conjunction with each other,
the control unit, in response to an instruction to change the position of the AF area, changes the position of the AF area and, at the same time, changes the position of the enlargement area in conjunction with the position of the enlargement area, and
the control unit, in response to an instruction to change the position of the enlargement area, changes the position of the enlargement area and, at the same time, changes the position of the AF area in conjunction with the position of the AF area; and
wherein, in a case where the AF mode set by the AF mode setting unit is a second AF mode, wherein the second AF mode is a different AF mode than the first AF mode,
the control unit, in response to an instruction to change the position of the enlargement area, changes the position of the enlargement area without changing the position of the AF area set by the AF area setting unit.

5. The imaging apparatus according to claim 1, further comprising an enlargement instruction detection unit configured to detect an instruction to enlarge the live view image,
wherein the display unit, in a case where the enlargement instruction detection unit detects an enlargement instruction, displays the live view image as a same size image and, at the same time, displays the enlargement area.

6. The imaging apparatus according to claim 5, wherein the display unit, in a case where the enlargement instruction detection unit further detects the enlargement instruction, displays an enlarged live view image of an area corresponding to the enlargement area.

7. The imaging apparatus according to claim 3, wherein in the case where the AF mode is set to the first AF mode, the control unit, in response to an instruction to change the position of the enlargement area, changes the position of the enlargement area and, at the same time, changes the position of the AF area in conjunction with the position of the enlargement area,
the display unit does not display the AF area.

8. The imaging apparatus according to claim 1, wherein in a case where the AF area setting unit, in response to an operation by a user for selecting an AF area used for AF from among a plurality of AF areas or in response to an automatic AF area selection, sets an AF area,
the control unit changes the position of the enlargement area in such a way that the center of the position of the enlargement area coincides with the center of the position of the selected AF area.

9. The imaging apparatus according to claim 1, wherein in a case where the AF area setting unit does not select an AF area used for AF from among a plurality of AF areas,
the control unit changes the position of the enlargement area in such a way that the center of the position of the enlargement area coincides with the center of a display screen on which the live view image is displayed.

10. A control method for an imaging apparatus, the control method comprising:
imaging a subject image, wherein the imaging apparatus has an entire shooting range which represents an area of the subject image that can be imaged by the imaging apparatus;
displaying a live view image of the subject image, imaged by the imaging;
setting an automatic focus (AF) area indicating an area to be used for AF, out of the live view image; and
performing control to change a position of an enlargement area relative to the entire shooting range in conjunction with a position of the set AF area, and to change, in response to an instruction to change the position of the enlargement area relative to the entire shooting range, the position of the enlargement area without changing the position of the set AF area relative to the entire shooting range, wherein the enlargement area indicates an area to be enlarged, wherein the position of the enlargement area is changed relative to the AF area.

11. A non-transitory computer-readable storage medium storing a program that controls an imaging apparatus comprising an imaging unit configured to image a subject image, wherein the imaging apparatus has an entire shooting range which represents an area of the subject image that can be imaged by the imaging apparatus, and a display unit configured to display a live view image of the subject image, imaged by the imaging unit, the program causing a computer to perform operations comprising:

setting an automatic focus (AF) area indicating an area to be used for AF, out of the live view image; and performing control to change a position of an enlargement area relative to the entire shooting range in conjunction with a position of the set AF area, and to change, in response to an instruction to change the position of the enlargement area relative to the entire shooting range, the position of the enlargement area without changing the position of the set AF area relative to the entire shooting range, wherein the enlargement area indicates an area to be enlarged, wherein the position of the enlargement area is changed relative to the AF area.

12. The imaging apparatus according to claim 4, wherein in the case where the AF mode is set to the first AF mode, the control unit, in response to an instruction to change the position of the enlargement area, changes the position of the enlargement area and, at the same time, changes the position of the AF area in conjunction with the position of the enlargement area, the display unit does not display the AF area.

* * * * *